United States Patent

Rhelimi

[11] Patent Number: 5,877,547
[45] Date of Patent: Mar. 2, 1999

[54] ACTIVE SECURITY DEVICE INCLUDING AN ELECTRONIC MEMORY

[75] Inventor: Alain Rhelimi, Cachan, France

[73] Assignee: Schlumberger Industries, Montrouge, France

[21] Appl. No.: 836,563

[22] PCT Filed: Nov. 15, 1995

[86] PCT No.: PCT/FR95/01497

§ 371 Date: Aug. 12, 1997

§ 102(e) Date: Aug. 12, 1997

[87] PCT Pub. No.: WO96/16378

PCT Pub. Date: May 30, 1996

[30] Foreign Application Priority Data

Nov. 17, 1994 [FR] France .................................. 94 13886
Mar. 8, 1995 [FR] France .................................. 96 02796

[51] Int. Cl.[6] .......................... H01L 23/02; H01L 23/48; H01L 23/52; H01L 29/40

[52] U.S. Cl. .......................... 257/679; 257/778; 257/922

[58] Field of Search .................................. 257/679, 778, 257/922

[56] References Cited

U.S. PATENT DOCUMENTS

| 4,105,156 | 8/1978 | Dethloff . |
| 4,593,384 | 6/1986 | Kleijne . |
| 5,214,308 | 5/1993 | Nishiguchi et al. . |
| 5,471,369 | 11/1995 | Honda et al. . |

Primary Examiner—Stephen D. Meier
Attorney, Agent, or Firm—Frishauf, Holtz, Goodman, Langer & Chick, P.C.

[57] ABSTRACT

The present invention concerns a security device containing secret information, of the type comprising a memory area of an integrated circuit receiving said information and protection means covering and fastened at least to the memory area. The protection means comprise at least a second integrated circuit. The device further includes interactive connecting means between the two integrated circuits and means for destroying the secret information if the connection is interrupted or disrupted.

25 Claims, 3 Drawing Sheets

ACTIVE SECURITY DEVICE INCLUDING AN ELECTRONIC MEMORY

The present invention concerns a security device including an electronic memory and designed to protect secret information contained in the memory.

BACKGROUND OF THE INVENTION

Such devices are included in portable payment terminals, for example, within an electronic security application module (SAM). These modules are very important because they contain secret information (example: bank keys), the discovery of which would allow access to an entire system.

The information is necessarily in an electronic layer of an integrated circuit. A passivation layer generally covers the electronic layer.

In some cases, this layer may not be a sufficient obstacle to access to the secret information, if sophisticated reading means are employed to read the information through the passivation layer. These reading means can utilize particle beam-type scanning techniques, for example.

Existing techniques intended to protect such information include the use of conventional intrusion sensors to protect an enclosure containing the electronic memory containing the information.

Also known in themselves are means protecting the integrated circuit directly against reading with the aid of sophisticated equipment. Said means are of two types: the first consists in masking the pattern of the semiconductor, for example by a metalization, a grid of dummy circuits or a diamond carbon layer; the second consists in memorizing the information in a RAM type memory and possibly combining it with random numbers that are changed continuously. The information is accessible only through an operating system that controls access to it. The principles used are identical to those of microprocessor cards. With this second type of means, the secrets contained in a RAM are always lost if the power supply to the component is interrupted. In this case, access to the information is not totally impossible providing the following are known:

how to eliminate the resin from the casing of the component when live, without creating a short-circuit that would lead to loss of the information, the exact schematic of the component, the memory "scrambling" table, the address of the secrets in the memory plane, and the correct manner of writing and reading the address bus and the data bus in real time.

The various prior art techniques mentioned hereinabove have the disadvantage of being ineffective if highly sophisticated means are employed or of being costly, in particular when diamond carbon masks are used.

OBJECTS AND SUMMARY OF THE INVENTION

An aim of the present invention is to provide an electronic security device that is more effective and the implementation of which is compatible with standardized fabrication processes.

To this end, the present invention consists in a security device containing secret information and designed to prevent access to said information by external exploration means, of the type including an integrated circuit having a memory area receiving said information and protection means covering and fastened at least to said memory area to form an obstacle to exploration, wherein said protection means comprise at least a second integrated circuit and wherein they further comprise interactive connection means between the two integrated circuits and means for destroying the secret information if their connection is interrupted or disrupted.

According to a feature of the invention, the device includes authentication means for authenticating at least the second integrated circuit.

In a first embodiment of the invention, the integrated circuits are disposed one behind the other and include external electrical connections connecting them to each other.

In a second embodiment of the invention the integrated circuits are disposed face-to-face and include internal electrical connections connecting them to each other.

BRIEF DESCRIPTION OF THE DRAWINGS

Other features and advantages of the present invention emerge from the following description of an embodiment of the invention given with reference to the accompanying drawings, in which.

MORE DETAILED DESCRIPTION

Figure 1:
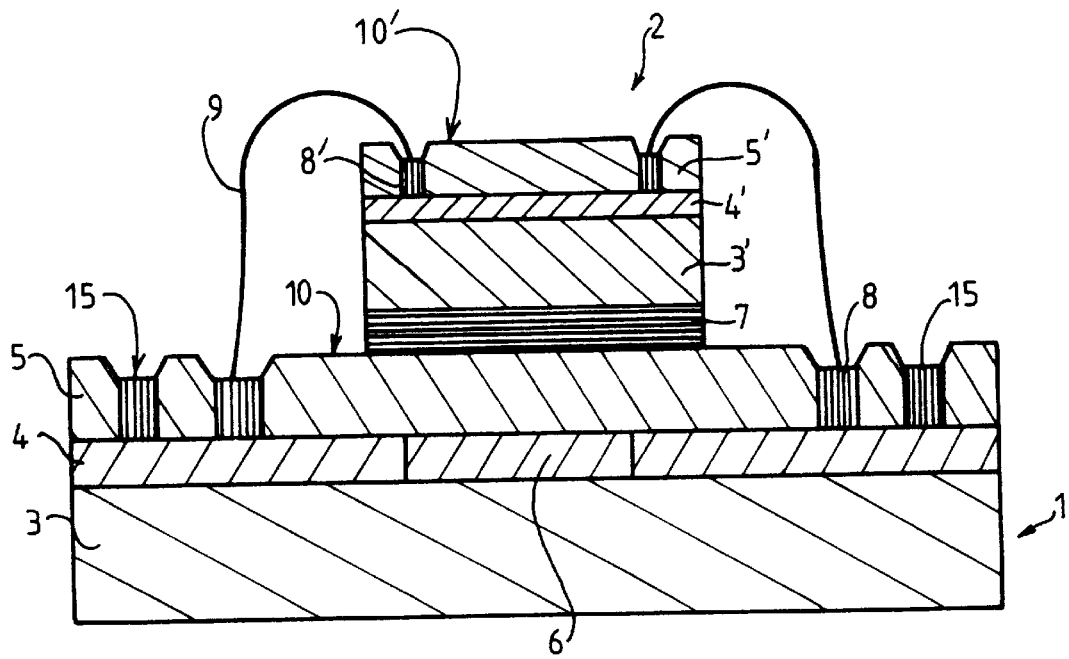
FIG. 1 shows in section the structure of a first embodiment of the invention.

Referring to FIG. 1, the security device comprises two electronic circuits disposed one above the other, a first circuit or "master" circuit 1 to be protected under a protecting second circuit or "slave" circuit 2. In this instance these circuits are two integrated circuits 1, 2 fastened together and connected together by connecting means. The connecting means must allow interaction between the master and slave circuits: exchange or circulation of flux or of signals of any kind (magnetic, electrical, optical, capacitive . . . ). They may consist in a simple electrical contact. The interaction is preferably dependent on the distance between the integrated circuits so that the smallest relative displacement of the two circuits interrupts it or disrupts it.

Instead of or in addition to the preferred connecting means, the connecting means of the invention also cover communication between the two circuits, which are then considered as transmitters and/or receivers.

Each integrated circuit comprises a substrate 3, 3', an electronic layer 4, 4' on the substrate and a passivation layer 5, 5' covering the electronic layer. The substrate is a semiconductor, usually silicon or gallium arsenide. This layer is between 100 $\mu$m and 300 $\mu$m thick. The electronic layer contains functions and a memory area 6, 6' to contain the secret information. This layer is about 10 $\mu$m thick. The passivation layer on top of the electronic layer is a layer of an inert material such as silicon nitride, for example. This layer is a few tens of micrometers thick.

The structure of the second integrated circuit is generally equivalent to that of the first circuit, apart from its dimensions; the electronic layer may include a memory area that can also contain some of the secret information. The second integrated circuit is disposed on top of the first so that it covers at least the memory area containing the secret information. It can also mask sensitive circuits such as the processor, the bus and the memories and any circuit element from which information on the secrets could be derived.

The two integrated circuits are fastened together, for example by a layer 7 of cyanoacrylate glue between the passivation layer of the first integrated circuit and the substrate of the second integrated circuit. The glue may be chosen so that any attempt to separate the two integrated circuits tears off either the passivation layer or the substrate.

A plurality of gluing areas may also be used, each with a glue of a different kind, or a combination of glues, or any other fastening technique.

The first integrated circuit is larger than the second to allow access to its power supply and connections. Connection means connect the two integrated circuits externally; to this end, connections 8 open onto the respective free surfaces 10, 10' of each integrated circuit. These connections are connected by gold or aluminium wires 9 which extend out of the integrated circuits. The electronic system is powered up at all times by an external back-up battery (not shown). The master component has connections 15 for connection to the environment, for example to the components of the SAM. In the conventional way, the wires may be embedded in a coating material such as resin.

The memory of the first integrated circuit and even that of the second may be of the RAM type.

According to an improved aspect of the invention, the security device may further comprise authentication means for authenticating at least the second electronic circuit. Authentication can be carried out at any time, periodically or at random. The period must be less than the time needed to substitute a simulation circuit for the second circuit. These means are preferably incorporated into both the integrated circuits. They cooperate to assure at least the authentication of the second integrated circuit. In this way authentication can be either unilateral or mutual. The authentication procedure involving the two integrated circuits may be based on a conventional process of exchanging cryptographic or electronic signals.

In accordance with a further improved aspect of device, the authentication means can use a procedure employing a dynamic session secret key that it is known in itself. The means to be employed are described in the American standard ANSI 9.24.

The security device includes means for destroying secret information in the absence of authentication and in the event of disconnection or destruction of one of the electronic circuits. These means are at least part of the first integrated circuit and are known in themselves, for example they are means for reinitializing the memory.

Figure 2:
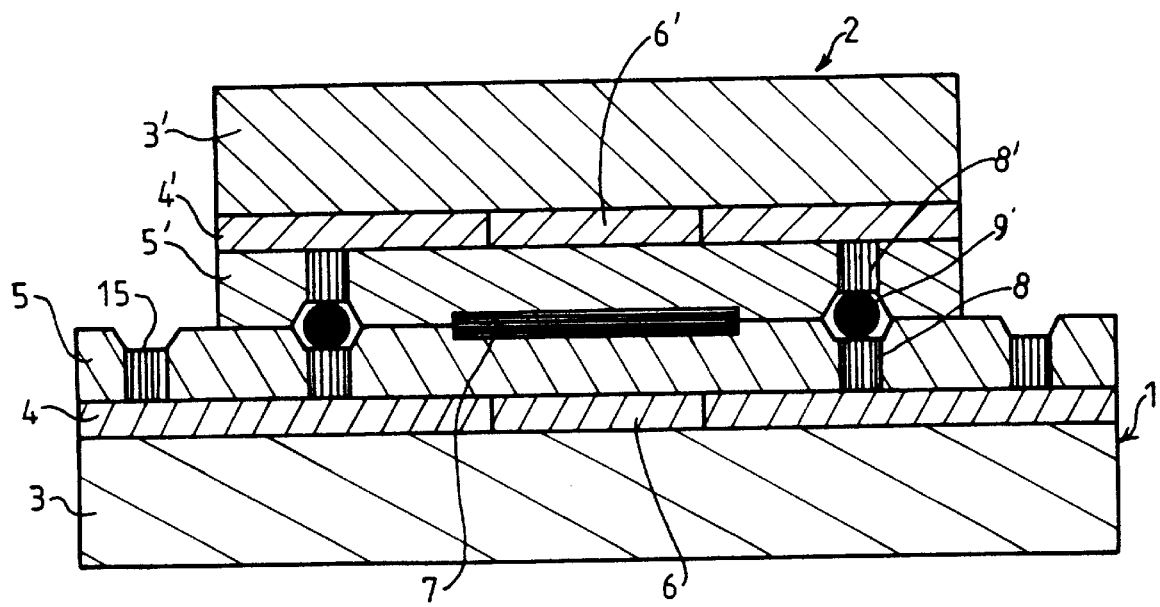
FIG. 2 shows in section the structure of a second embodiment of the invention.

FIG. 2 shows a different form of the security device of the invention. It is also made up of two integrated circuits, the structure of each of which is globally identical to that of the integrated circuits of the previous embodiment. The same reference numbers are therefore used to designate the same items. The essential difference is that the two integrated circuits are disposed face-to-face.

With this arrangement, the passivation layers of the two integrated circuits are mechanically fastened together. They are fastened together so that their connections are aligned with each other. The two integrated circuits can be fastened together by a layer of cyanoacrylate glue, as previously.

The electrical contact between the two circuits may be made by means of a conductive glue, for example a silver-based glue. In one embodiment of the connections, the latter are effected by means of a bonding technique, in the conventional way using indium balls 9', for example.

The same conductive glue can be used not only to make the contact but also to fasten the two integrated circuits together. In this way, using solvent to dissolve the glue in order to separate the components also breaks the electrical connection.

The slave component may advantageously be energized first, externally, after which the electrical power supply passes through the internal electrical connections between the components to energize the master component, or vice versa.

Accordingly, if the circuits are separated, the power supply to the master component is interrupted and the information is lost if it is in RAM (volatile memory with no back-up power supply).

This arrangement is particularly beneficial in that the connections between the two integrated circuits are internal, which represents a further barrier to violation of the security device.

The secret information can be divided between the master and slave components. The components can be of the same importance and serve as master and slave turn and turn about.

The protection principle can be applied to a number of integrated circuits greater than two. The integrated circuits can be stacked one on top of the other.

The master component can also have n surfaces to be protected, each surface being covered by a slave component.

The same electronic layer can include a plurality of master electronic circuits each containing part of the secret information and each protected by a slave component.

The device can be constructed from two integrated circuits using the standard "multi-chip-module" (MCM) fabrication technique. This device therefore has the advantage of being economical.

Figure 3:
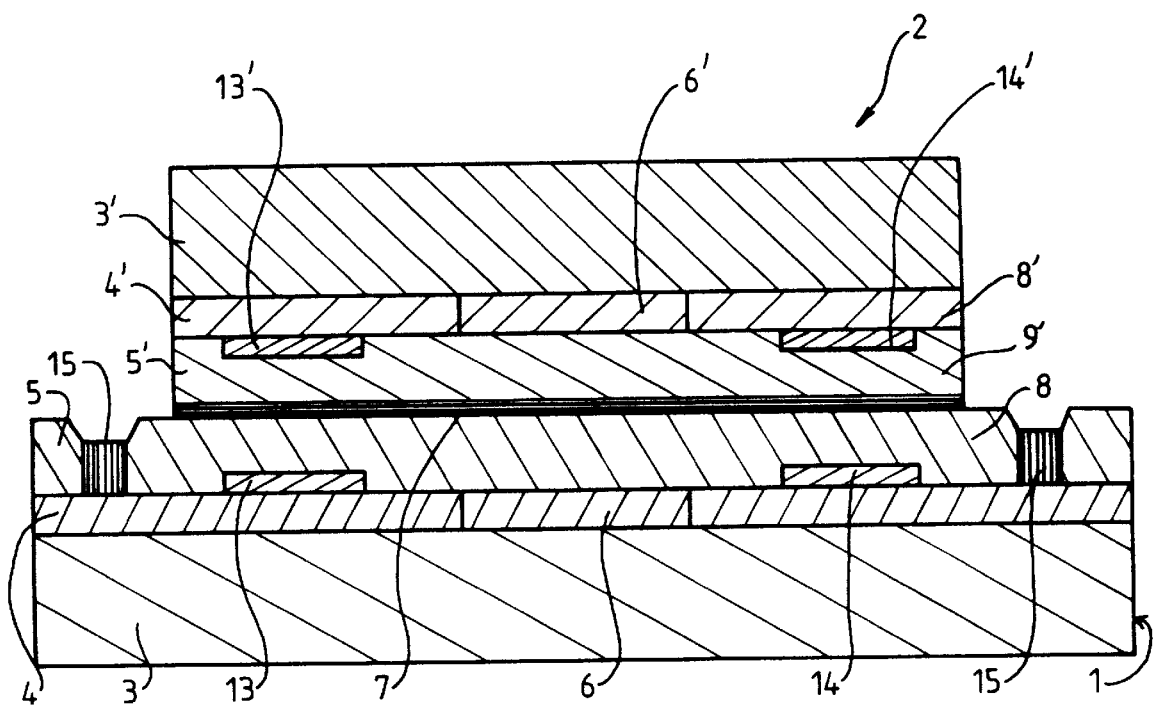
FIG. 3 shows the invention with particular interactive connection modes.

In FIG. 3 the two components are disposed face-to-face, as in FIG. 2. The same reference numbers are used for the same items. The fastening means are separate from the electrical connection means, however.

The connection means each comprise an electromagnetic coil etched on the semiconductor of each component. These coils are disposed face-to-face and coupled electromagnetically, preferably closely coupled. This assures magnetic interaction between the two components.

This interaction can advantageously be used to convey communication information between the two components, for example for the purpose of authentication by the procedure previously described. It also enables one component to be supplied with power through the other.

Communication for transmission of data and power supply are preferably effected at the same time via the same coils. The means to be employed, known in themselves, are described in the ISO standard (IEC 10536 part 3). They use two out-of-phase signals to energize the coils. Very close electromagnetic coupling tolerates virtually no displacement of one component relative to the other. The slightest displacement disrupts or interrupts the interaction between the sending and receiving coils. Similarly, any attempt to insert a signal rerouting member between the connections causes detectable disruption or interruption of the interaction.

Interruption of the power supply to a component containing information in a RAM leads to loss of the information and disruption can lead to total or partial modification of the communication signal and corrupt the integrity of a message between the two components.

One way to detect corruption of the integrity of a message is to use conventional error correcting or error detecting codes such as the Hamming code or CRC 16 code (polynomial code).

If an error is detected, the destruction means are activated to eliminate the secret information. If a RAM is used, the destruction means may consist in means of interrupting the power supply to the component, for example a transistor connected in series with the memory power supply bus.

The components may include other connecting means in place of the electromagnetic coils. The circuit elements 13, 13', 14, 14' may be capacitors or optical diodes for capacitive interaction or opto-electronic interaction, respectively.

In the case of opto-electronic coupling, a transparent window is provided between the components 13, 13' and 14, 14', either by virtue of the absence of material or by employing a transparent material (not shown).

The means for exploiting and processing such signals are conventional. The authentication means and the information destruction means can be identical to the means described with reference to FIGS. 1 and 2.

The first integrated circuit can also be supplied with power by capacitive coupling.

Two different types of connection may be used for the power supply and for data transmission, for example electromagnetic coupling for one and capacitive coupling for the other.

The security device from FIG. 1 operates as described hereinafter.

The device being powered up, for example from an external back-up battery, periodic communication is established between the two components, for example to carry out a mutual authentication procedure as defined by ISO/IEC standard 9594-8, for example. If one of the two components interrupts the communication and/or is not authenticated correctly, the secret information is erased in the component that fails to authenticate the other component. If necessary, to prevent any simulation of components in question, the secret authentication key is a dynamic session key created with the active security module is initialized.

To reach the secrets contained in the first integrated circuit it is first necessary to remove the integrated circuit disposed on top of it, without the latter being destroyed or modified. Given the manner in which the two integrated circuits are fastened together, for example by means of a cyanoacrylate glue, it is virtually impossible or extremely perilous to attempt to separate the second circuit without destroying it.

Assuming that means were available for separating the second integrated circuit from the first circuit without destroying it or deactivating it, the second embodiment of the security device could then be used (FIG. 2 or FIG. 3).

The device from FIGS. 1 and 2 operates in the manner described hereinafter.

If the electrical connections are assured internally by simple contact, gluing or soldering using indium balls, it is then impossible to uncouple the two integrated circuits without breaking the contact.

If the connections are effected electromagnetically, capacitively, optically, mere movement of one component relative to the other disturbs the interaction and this is treated as a broken connection.

If the connections supply power to the integrated circuits, breaking them leads to the erasing of the information contained in a volatile RAM.

Uncoupling is more difficult if the connections are near the middle of the security device, that is to say near the middle of the respective contact surfaces of the master and slave components.

The authentication means of the second embodiment of the security device operate in exactly the same way as those of the first embodiment.

If electrical connections are used for communication in the context of an authentication procedure, breaking them results in no authentication in the period allowed and the means for destroying the information are activated, for example to set all memory locations to the same level.

In the preferred case where a RAM is used to contain the secret information, the destruction means are means for cutting off the power supply to the component.

In this second embodiment, displacement of one circuit relative to the other always leads to the loss of the secret information.

Figure 4:
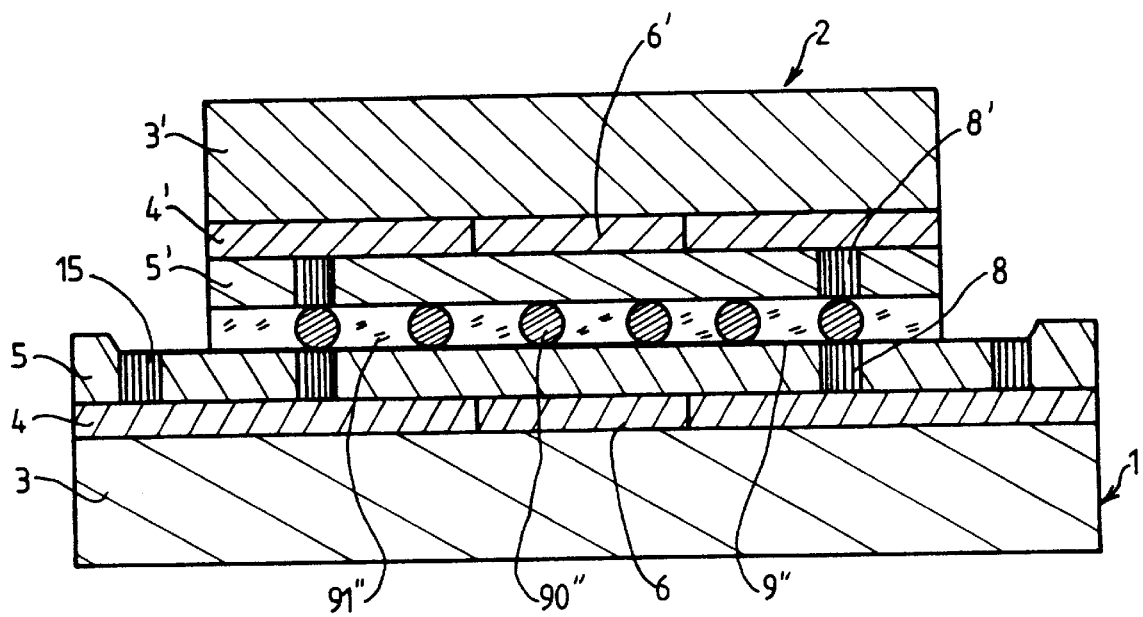
FIG. 4 shows in section the structure of a third embodiment of the invention.

In FIG. 4, the two components are disposed face-to-face, as in FIGS. 2 and 3. The same reference numbers are used for the same items.

However, in this embodiment, the fastening means are different. It can be seen that the electrical connection is performed by an anisotropic conductive film 9" formed by microballs 90", polymeric balls of 10 to 20 $\mu$m coated with gold for example, isolated from each other in an adhesive foil 91", electrically isolating and made of epoxy resin or thermoplastic resin. When pressure is applied on this assembly, microballs present in the area between connection points 8, 8' come into contact with said connection points and constitute a conducting path between the two circuits. On the contrary, no contact is performed between microballs 90" in a perpendicular direction. The adhesive foil 91" remains fully isolating preventing any electrical current. Such an anisotropic conducting film is available from company CDS under the name Alpha Bond.

Figure 5:
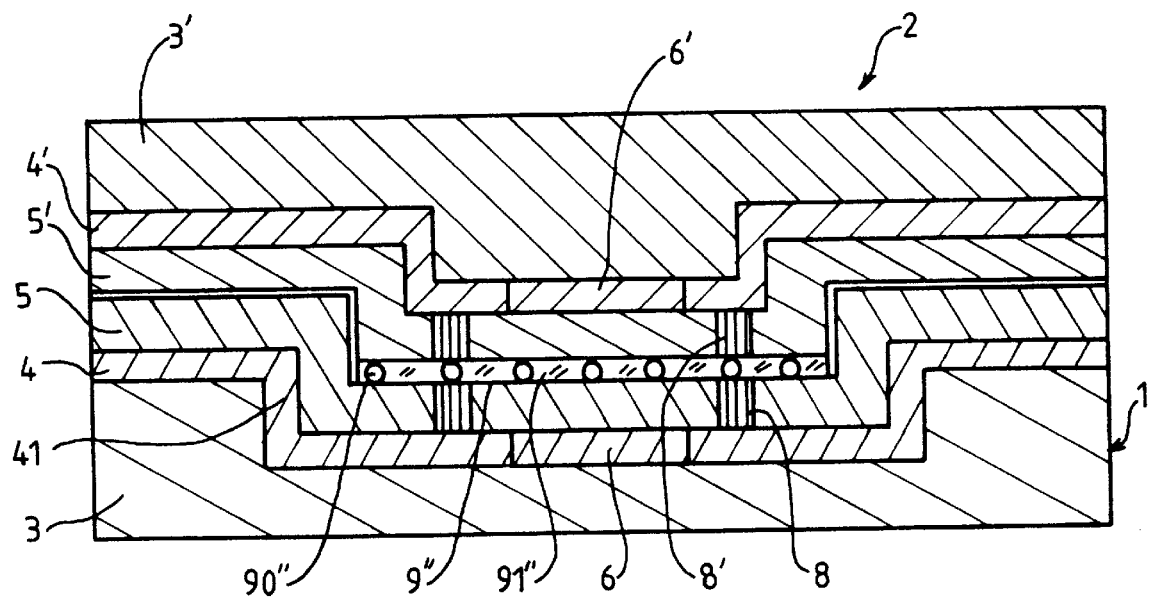
FIG. 5 shows in section an alternative of the structure of the invention.

In FIG. 5 is shown an alternative embodiment of the structure of the security device in accordance with the invention.

In this alternative embodiment, the memory area containing the secret information has a lateral shoulder 41. It can be understood that in that way any attempt to reach the memory area by lateral exploring of the device is not possible since, because of the presence of shoulder 41, it would result in an important disturbance of the first integrated circuit functioning preventing any mutual authentication with the second integrated circuit, which would lead to the destruction of the secret information.

Practically, passivation layer 5 of the first integrated circuit deposited on memory area 4 also has a shoulder, so that said first circuit shows in section a hollow profile. Thus, the second integrated circuit is such made that passivation layer 5' shows in section a projecting profile, conjugated with the hollow profile of the first circuit.

It is therefore possible to merely fit face-to-face two circuits into one another.

Advantageously, the interval between the two passivation layers 5, 5' is filled with teflon.

I claim:

1. A security device containing secret information and designed to prevent access to the secret information with external exploration means, comprising:

a first integrated circuit having a memory area for storing the secret information;

protection means covering at least said memory area and fastened to said first integrated circuit to form an obstacle to exploration by the external exploration means, wherein said protection means comprise a second integrated circuit;

interactive connection means to provide interaction between said first and second integrated circuits; and means for destroying the secret information if relative movement between said first and second integrated circuits is such that said interaction is interrupted or disrupted.

2. A security device according to claim 1, wherein said interactive connection means includes authentication means for authenticating at least the second integrated circuit.

3. A security device according to claim 2, wherein the authentication means employ a procedure using a dynamic session secret key.

4. A security device according to claim 1, wherein the first and second integrated circuits are disposed one behind the other and include external electrical connections connecting them to each other.

5. A security device according to claim 1, wherein the first and second integrated circuits are disposed face-to-face and include internal electrical connections connecting them to each other.

6. A security device according to claim 5, wherein a power supply to the first or second integrated circuit is effected through internal electrical connections.

7. A security device according to claim 5, wherein at least the memory area of the first integrated circuit has a lateral shoulder.

8. A security device according to claim 7, wherein said first and second integrated circuits have conjugated profiles so as to be fitted into one another.

9. A security device according to claim 5, wherein the first and second integrated circuits have their electrical connections disposed face-to-face.

10. A security device according to claim 9, wherein the first and second integrated circuits are connected by soldering.

11. A security device according to claim 9, wherein the electrical connections are effected by means of a conductive glue.

12. A security device according to claim 11, wherein the first and second integrated circuits are fixed together by a layer of conductive glue.

13. A security device according to claim 9, wherein the first and second integrated circuits are connected by an anisotropic conductive film.

14. A security device according to claim 13, wherein connections which supply power to the first integrated circuit also transmit data.

15. A security device according to claim 1, wherein the first and second integrated circuits are disposed face-to-face and include electromagnetic or capacitive internal connections.

16. A security device according to claim 15, wherein the connections of the first and second integrated circuits are in a central area of their respective contact face.

17. A security device according to claim 1, wherein the first and second integrated circuits are fixed together by a layer of glue.

18. A security device according to claim 1, wherein the second integrated circuit also includes a memory area and wherein the interactive connection means include mutual authentication means.

19. A security device according to claim 1, wherein at least one of the first and second integrated circuits includes a RAM containing secret information.

20. A security device according to claim 1, wherein each of the first and second integrated circuits covers circuit elements of the other integrated circuit from which the secret information can be derived.

21. A security device according to claim 1, wherein said protection means is fastened at least to said memory area.

22. A security device containing secret information and designed to prevent access to the secret information with external exploration means, comprising:

a first integrated circuit having a memory area for storing the secret information;

protection means covering at least said memory area and fastened to said first integrated circuit to form an obstacle to exploration by the external exploration means, wherein said protection means comprises a second integrated circuit;

authentication means for authenticating at least said second integrated circuit via interactive connection means between said first and second integrated circuits; and means for destroying the secret information of said interactive connection means is interrupted or disrupted to thereby render the authentication of said second integrated circuit incorrect.

23. A security device according to claim 22, wherein the authentication means employ a procedure using a dynamic session secret key.

24. A security device according to claim 23, wherein the second integrated circuit also includes a memory area, and wherein said authentication means include means for mutual authentication between the first and second integrated circuits.

25. A security device according to claim 22, wherein said protection means is fastened at least to said memory area.

* * * * *

UNITED STATES PATENT AND TRADEMARK OFFICE
CERTIFICATE OF CORRECTION

PATENT NO. : 5,877,547
DATED      : March 2, 1999
INVENTOR(S) : Alain RHELIMI

It is certified that error appears in the above-identified patent and that said Letters Patent is hereby corrected as shown below:

Column 8, line 37 (claim 22, line 14) change "of" to --if--;

Column 8, line 44 (claim 24, line 1) change "claim 23" to --claim 22--.

Signed and Sealed this

Sixth Day of June, 2000

Attest:

Q. TODD DICKINSON

*Attesting Officer*            *Director of Patents and Trademarks*